United States Patent

Wood

[11] 3,823,325
[45] July 9, 1974

[54] X-RAY LASER
[75] Inventor: Lowell L. Wood, Simi, Calif.
[73] Assignee: The United States of America as represented by the United States Atomic Energy Commission, Washington, D.C.
[22] Filed: July 23, 1973
[21] Appl. No.: 381,631

[52] U.S. Cl................................ 250/493, 331/94.5
[51] Int. Cl. ........................................... G03b 41/16
[58] Field of Search.................... 250/503; 331/94.5

[56] References Cited
UNITED STATES PATENTS

| | | | |
|---|---|---|---|
| 3,388,314 | 6/1968 | Gould | 331/94.5 |
| 3,617,939 | 11/1971 | Bond | 250/493 |
| R25,632 | 8/1964 | Boyle | 331/94.5 P |

Primary Examiner—James W. Lawrence
Assistant Examiner—C. E. Church
Attorney, Agent, or Firm—John A. Horan; F. A. Robertson; L. E. Carnaham

[57] ABSTRACT

An x-ray laser utilizing rapid flash heating of a filament of intermediate Z material to temperatures of the order of the K-shell binding energy of the material.

6 Claims, 1 Drawing Figure

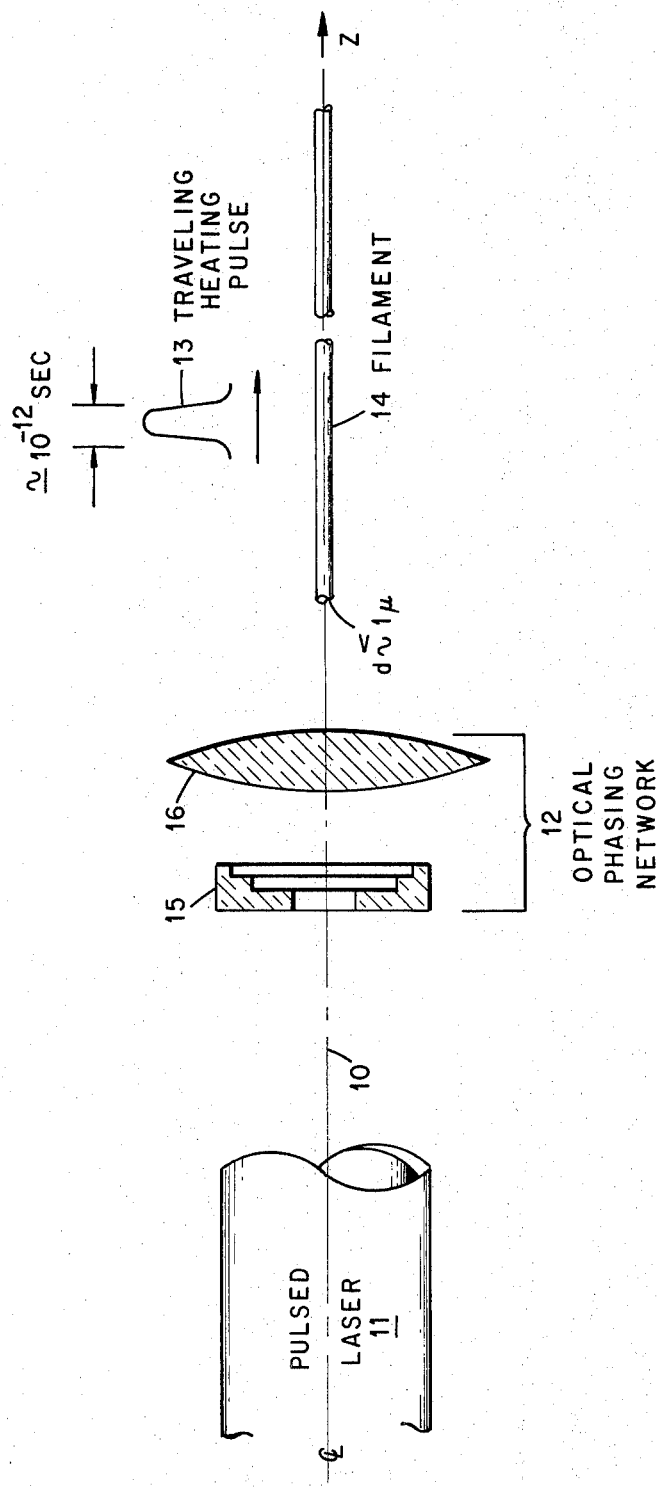

X-RAY LASER

BACKGROUND OF THE INVENTION

The invention described herein was made in the course of, or under, Contract No. W-7405-ENG-48, with the United States Atomic Energy Commission.

This invention relates to laser systems, and more particularly to an x-ray laser using flash heated medium.

Methods have been previously proposed to produce an x-ray laser system. These prior methods generally require unrealistically great time to establish alleged level population inversion, or develop population inversions in media which would show net negative gain, due to photoelectric losses, for example.

Because spontaneous emission is proportional to the third power of the frequency, extension of laser operations to high frequencies becomes increasingly more difficult. Noting a typical transition probability $\approx 10^9$ $\sec^{-1}$ for a 10 ev transition in the ultraviolet ($\approx 0.1$ $\mu m$), the transition probability for 100 ev x-rays is $\approx 10^{11}$ $\sec^{-1}$. Hence, x-ray level population inversion must be established in $\lesssim 10^{-11}$ sec for x-ray $\lesssim 100$ ev.

SUMMARY OF THE INVENTION

The present invention provides an x-ray laser based on the rapid ($\lesssim 10^{-12}$ sec) flash-heating of a filament of intermediate Z (Z>2 and <30) material to temperatures of the order of the K-shell binding energy of the material.

Therefore, it is an object of the invention to provide an x-ray laser.

A further object of the invention is to provide an x-ray laser using flash-heated medium.

Another object of the invention is to provide an x-ray laser based on the rapid flash-heating of a filament of intermediate Z material.

Other objects of the invention, will become readily apparent from the following description and accompanying drawing.

BRIEF DESCRIPTION OF THE DRAWING

The single FIGURE schematically illustrates an embodiment of an x-ray laser made in accordance with the invention.

DESCRIPTION OF THE INVENTION

The present invention is directed to an x-ray laser based on the rapid ($\lesssim 10^{-12}$ sec) flash heating of a filament of intermediate Z (Z>2 and <30) material to temperatures (1–10 Kev) of the order of the K-shell binding energy of the material.

As pointed out above, the spontaneous emission rate is proportional to the second power of the frequency, and thus extension of laser operations to higher frequencies becomes increasingly difficult. Also, as pointed out above, the transition probability for 100 ev x-rays is $\approx 10^{11}$ $\sec^{-1}$, based on the typical transition probability $\approx 10^9$ $\sec^{-1}$ for a 10 ev transition in the ultraviolet ($\approx 0.1$ $\mu m$). Hence, x-ray level population inversion must be established in $\lesssim 10^{-11}$ sec for x-ray 24 100 ev.

This invention uses an ultra short pulse of laser radiation ($\lesssim ^{-12}$ sec) to produce the population inversion by flash-heating, and subsequent radial expansion in a fine wire or filament ($\lesssim 1$ $\mu m$ diameter). Lasing is accomplished by causing the heating, subsequently population inverting pulse to proceed along the wire (filament) with the group velocity of light in the expanding material; the x-ray amplifying, inversion-destroying de-excitations are thereby induced to proceed in phase with the heating pulse down the length of the wire. The population inversion develops transiently because the multi-body (predominantly three-body) processes in the dense, hydrodynamically cooling electron gas populate the upper bound states of the initially hydrogenic (essentially completely ionized) ions faster than the (mostly) radiative processes (two-body in nature) populate the lower bound states. Use of an appropriate heating pulse and a hollow (tubular) fiber may be made to result in radial implosion of the fiber to densities two to three orders of magnitude in excess of solid densities, further concentrating the heating pulse energy in space and time and permitting the attainment of population inversions in higher Z elements than would be possible without implosion. This advantage occurs because the imploded, highly compressed material is hydrodynamically heated and chilled much more rapidly in the imploded configuration than is attainable in any non-imploded one, permitting population inversions to be developed through collisional recombination in spite of faster radiative recombination processes in higher Z elements.

An embodiment of the x-ray laser system is illustrated in the drawing. The optical path length for a radiation beam 10 from a pulsed laser 11 is adjusted by an optical phase delay network, generally indicated at 12, so that a traveling wave heating pulse 13 passes along an x-ray lasing medium such as a filament or wire 14 (in direction of positive z axis) of an intermediate Z material at the group velocity of the x-radiation through the heated material of filament 14. The traveling wave heating pulse 14 has a width of $\lesssim 10^{-12}$ sec, with the filament 14 having a diameter of $\lesssim 1$ $\mu m$ and a length of 1 mm or more. For example, the filament 14 may be made of solid density fibers such as aluminum (Al) having a Z of 13 or titanium (Ti) having a Z of 22, or of imploded, hollow fibers such as iron (Fe) having a Z of 26 or copper (Cu) having a Z of 29. The pulsed laser 11 may be of the gas, chemical or other type capable of producing a $\lesssim 10^{-12}$ sec pulse. (Approximately $\lesssim 10^{12}$ watts – $\lesssim 1$ joule in $\lesssim 10^{-12}$ sec). The optical phasing network 12 consists of a corrector plate 15 and a lens 16. Network 12 satisfies simultaneously (a) group velocity heating criterion, and (b) requirement of equal heating per unit length.

It is extremely difficult to accurately estimate the populations of various levels as a function of time in the face of many complex and usually quite non-linear phenomena; the hydrodynamics of the situation alone precludes quantitative analytic treatment. For this reason the use of complex digital computer simulation efforts have been resorted to. The computer efforts have shown that 100 ev population inversion systems appear to be readily practicable since picosecond pump (flash-heating) laser sources are presently available. 1 kev population inversions involving allowed transitions are not currently obtainable in the sub-picosecond ($10^{-13}$) time scale, as pumping sources having such characteristic times are currently not available. Should $\lesssim 10^{-13}$ sec pump sources become available, population inversions may be created and utilized between electromagnetically connected levels in high Z plasmas, such that the photon connecting the levels has energy of the order of 1 kev.

The particular physical systems thus modelled in the computer simulation efforts, and illustrated in the drawing, have been effectively right circular cylinders of intermediate Z metal, initially at normal density and effectively zero temperature. Their electron temperature and density histories were followed on a hydrodynamics and energy flow code as functions of radius and time as they are flash heated.

These temperature and density histories are then imputted to an isotropic, infinite medium simulation which computes bound electron shell populations in the average atom approximation, in the presence of a specified multigroup radiation field, taking into account free-free, bound-free and bound-bound radiation emission and absorption, and collisional excitation, ionization and recombination. The average atom approximation was believed to have been conservative, as most or all of the levels of a given shell must be superpopulated or underpopulated for an inversion of one shell relative to another to develop; inversion which might develop between particular levels of two shells were thus not counted.

The plasmas were transversely thin to their own radiation, except at the line centers, and the ambient radiation field was thus always specified to have no radiation in it; photons inputted to the radiation field by electrons becoming ever more tightly bound to ions were ejected from the simulations at the end of each very short simulation time step.

With picosecond-scale flash heating of aluminum fibers, inversions of the m-shell with respect to the $l$-shell have been seen in such simulations; similar inversions were seen for titanium fibers flash heated at higher rates and densities.

Since sound velocities are of the order of micron per picosecond at the appropriate electron temperatures for these cases of a few kilovolt temperatures, the initial diameters of these metal fibers were chosen to be of the order of a micron; the corresponding heat capacities were of the order of 10 joules/cm length of the fiber. Even taking into account the collisional and possible Stark broadening of the transitions of interest, lengths of considerably less than 1 cm were sufficient to achieve gains in excess of 100dB, more than sufficient to obtain superradiant axial pulses. Thus, the higher the inversion density can be made to be at a constant gain linewidth, the shorter the fiber must be to obtain a given axial gain.

The lasers are essentially four-level ones, in which the collisionally — and Stark-lowered continuum and the highly excited states are collectively the upper-most level, the $m$-shell is the upper lasing level, the $l$-shell is the lower one, and the lowest level is the $k$-shell, the sink into which the $l$-shell electrons dump after (possibly stimulated) transitions from the m and higher shells. It is when the small $k$-shell fills, and the $l$-shell "chokes up", that the system becomes a three level one and soon ceases to lase. The short radiative lifetime of the lower laser level relative to that of the upper level is of course primarily responsible for the creation and maintenance of the population inversion.

Transient population inversions between shells higher than the $(m,l)$ pair have also been noted, but $(l,k)$ inversions have not; the reasons for both of these are believed clear from the above discussion.

It is thus relatively straightforward to create population inversions involving photons of several hundred ev with present technological means; inversions of kilovolt energies are currently not obtainable, except through employment of energy-concentrating means, such as radial implosions.

It has thus been shown that the present invention provides an x-ray laser based on the rapid $10^{-12}$ sec) flash heating of a filament of intermediate Z material to temperatures of the order of the $k$-shell binding energy of the material, thus providing a significant advancement in the art.

While a particular embodiment of the invention has been illustrated and described, modifications will become apparent to those skilled in the art, and it is intended to cover in the appended claims all such modifications as come within the spirit and scope of the invention.

What is claimed is:

1. An x-ray laser utilizing flash-heating of a lasing medium to temperatures of the order of the K-shell binding energy of the medium comprising: means for producing a beam of laser radiation having a pulse of up to about $10^{-12}$ seconds, a longitudinally extending lasing medium of material having a diameter of up to about 1 micron and a Z in the range between 2 and 30 and an optical phasing network positioned intermediate said radiation producing means and said lasing medium, said lasing medium being axially aligned with said beam of radiation such that said beam produces flash-heating of said lasing medium producing a traveling heat pulse passing longitudinally along the lasing medium at the group velocity of x-radiation through the heated lasing medium causing a population inversion and lasing of the material.

2. The x-ray laser defined in claim 1, wherein said means for producing a beam of radiation comprises a pulsed laser.

3. The x-ray laser defined in claim 1, wherein said lasing medium comprises a metallic filament.

4. The x-ray laser defined in claim 3, wherein said filament is selected from the group consisting of aluminum, titanium, iron, and copper.

5. The x-ray laser defined in claim 1, wherein said optical phasing network comprises a corrector plate and a lens.

6. The x-ray laser defined in claim 1, wherein said lasing medium comprises a filament configured as a hollow fiber which the heating pulse causes to radially implode to high density and temperature prior to subsequent hydrodynamic relaxation and population inversion creation, so as to be able to further concentrate the energy of the heating pulse in space and time and afford the creation of population inversions in elements of higher Z thus allowing x-ray laser action involving more energetic photons to be produced.

* * * * *